United States Patent Office 3,303,086
Patented Feb. 7, 1967

3,303,086
FOAMED POLYURETHANE LAMINATE AND THE ADHESIVE COMPOSITION
Alfred J. Demers, Peabody, Mass., assignor to The Borden Company, New York, N.Y., a corporation of New Jersey
No Drawing. Filed Apr. 29, 1963, Ser. No. 276,150
9 Claims. (Cl. 161—159)

This invention relates to a flexible adhesive for materials, one of which at least is vapor permeable. The invention is particularly useful in connection with acrylic resins for adhering foamed polyurethane sheets or the like to a fabric backing and will be illustrated in connection with such use.

A major problem has been the short pot life after the addition of the acid catalyst to cure the resin in the latex. As a result, the adhesive is frequency omitted entirely and substituted by miniscular fusion, i.e., superficial melting of the foamed plastic. The fused film, while still in molten or active adhesive condition, is then pressed against the backing material. This superficial fusion, although very slight, causes a significant decrease in the foam thickness. Also the system requires special equipment.

The present invention increases the pot life of the previously used acrylic latices up to a maximum of 72 hours or more. It replaces the miniscular fusion by an adhesive composition that is economical but has such bond strength that, after soaking the adhered polyurethane and fabric backing in a solvent such as perchlorethylene for 30 minutes, separation tests show that the polyurethane foam bonded thereby tears before the adhesive bond breaks.

The invention comprises the herein described aqueous emulsion of a copolymer of an ester of acrylic or methacrylic acid with an alpha-unsaturated acid, a catalyst establishing the pH at a level below 7, and a large proportion of an insoluble stabilizer powder suspended in said emulsion. The commercial embodiment includes a melamine-formaldehyde condensation product, admixed in a form that is reactive with the acid moiety in said copolymer, to give cross linking and solvent resistance in the cured adhesive film.

As the acrylic ester, I use ordinarily a polymer of ethyl, propyl, or other $C_{1-4}$ alkyl ester of acrylic acid. The corresponding esters of methacrylic acid may be used, as in admixture with at least an equal amount of one of said esters of acrylic acid. The selected ester is ordinarily purchased as a copolymer or terpolymer in the form of a commercial latex, such as one of about 45%–46% solids content in which the acrylic ester or esters are copolymerized with an alpha-unsaturated, water soluble aliphatic acid such as acrylic, methacrylic, itaconic, crotonic, mesaconic, citraconic, fumaric and maleic acid or anhydride, in the proportion of about 0.5%–5% of the unsaturated acid or anhydride on the weight of the acrylic ester.

The melamine compound is introduced when increased solvent resistance is desired. It is any one of the water soluble, hydroxyl-group-retaining melamine-formaldehyde condensates, e.g., dimeric, trimeric, or monomeric methylol melamines. In any case it must be subject to reaction (or copolymerization) with the acrylic polymer. Examples of materials of this class are those melamine-formaldehyde resin sold for imparting crease resistance to fabrics such as "Aerotex M-3."

The stabilizer powder is clay, aluminum silicate, or other powdered water insoluble mineral which, when suspended in water, remains chemically inert at the pH and the curing temperatures encountered in the storage or application of the product. An example is the grade known as "ASP-400," a clay which has been washed substantially free of water solubles and suitably separated also from the finest particles of the original clay, a represensative sample of this product having particle sizes within the range 0.4–25 microns with a distribution such that 70% of the particles are within the range 1.5–10 microns.

Other stabilizers that may be used are diatomaceous earth, fuller's earth, and fine cellulose fibers of crystalloid fineness of particles such as "Avicel."

Omission of the stabilizer powder reduces the pot life of the adhesive in representative preparations from about 24–72 hours to about 8–12 hours.

The thickener for the acrylic latices, like the stabilizer, must be effective at a pH below 7. Particularly satisfactory are the sodium or other alkali metal (or ammonium) polyacrylates or polymethacrylates, a grade of the sodium polyacrylate used being "Acrysol GS." Other thickeners that may be used include those that are conventional in acrylic resin latices. Examples are ethyl, hydroxethyl, methylhydroxyethyl cellulose and the salts of carboxymethyl cellulose with alkali metals such as sodium, potassium or lithium or with ammonium. Other examples are the homopolymers of polyoxyethylene of molecular weights 4,000–4,000,000 ("Polyox WSR" grades 35, 205, 301 and other grade). Also the natural gums, e.g., locust bean, arabic, karaya and guar gums, may be used.

As the catalyst, acidic salts or acids are ordinarily selected, as for instance, ammonium chloride, sulfate, and dihydrogen phosphate; hydrochloric, sulfuric, phosphoric, oxalic, or other acids; and latent catalysts that are recommended in the curing of melamine-formaldehyde resins as, for instance, chloroacetonitrile or glyceryl phthalate. The catalyst should be of kind and in amount to establish the pH below 8 in the composition as first prepared and below 7 as the heating progresses during curing of the resin.

Proportions of the various materials that are permissible and those recommended for commercial use are shown in the following table.

| Component | Parts by Weight | |
|---|---|---|
| | Permissible | Recommended |
| Acrylic Ester | 100 | 100 |
| Melamine-formaldehyde condensate | 2–15 | 4–10 |
| Alpha-unsaturated acid | 0.5–5 | 2–3 |
| Stabilizer powder | 20–65 | 40–50 |
| Thickener | 0–3 | 0.05–2 |
| Water | 50–200 | 90–120 |
| Additional water for 100 parts of said stabilizer | 40–150 | 90–120 |
| Catalyst in amount to establish: | | |
| pH before heating | 5.5–8 | 6–7 |
| pH during curing | 3.5–7 | 4–6.5 |

The components other than water are dispersed in the water, i.e., dissolved, emulsified (in the case of the resin) or suspended (in the case of the stabilizer powder).

Use of the melamine resin in amount above the maximum shown causes brittleness. Omission of it entirely causes lack of solvent resistance in the dried adhesive film.

Use of the stabilizer powder in proportion above the maximum shown causes loss of solvent resistance. Use in proportion below the minimum shortens the pot life.

After the effect of clay or the like in increasing the pot life has been discovered, various theories may be advanced to explain the mechanism by which the effect is obtained. An important part of the stabilizing is attributed to the association of the resin component with, or partial isolation of it by, the large amount of the powdered stabilizer in such manner as to interfere with a copolymerization and delay formation of a continuous polymerized mass.

The thickener is introduced in amount to establish the viscosity desired in the finished adhesive, ordinarily about 5–30 and preferably 10–20 poises as measured at 20° C. The quantity required varies with the thickener selected. Polyox is used at such low proportions as 0.005 part and up to about 0.5 for 100 parts of the acrylic resin, the exact amount decreasing with the molecular weight of the grade selected. The sodium polyacrylate is used ordinarily in the amount of about 1.5 parts. The proportion of the catalyst of curing, required to establish the pH stated, also varies with the catalyst selected. For ammonium chloride and other salts of ammonium with strong mineral acids, the amount used is about 0.5–2 parts. For hydrochloric or like strong (highly ionized) acid, the proportion required will be less.

As to conditions of mixing, the preferred procedure is to introduce the catalyst, such as ammonium chloride in aqueous 10% solution, into the acrylic ester latex of kind described, slurry the clay with water, stir the resulting clay slip into the latex and catalyst mixture, and then introduce and stir in the thickener.

Before application to a surface to be adhered the melamine-formaldehyde reaction product, dissolved in water, as for instance, in 200 parts of water to 64 of said product, is admixed.

The compounding as described is made suitably at room temperature.

The invention will be further described in connection with the following specific examples of the practice of it, proportions here and elsewhere herein being expressed as parts by weight.

*Example 1*

An adhesive was made of the following composition, all weights except those of said latex and solution being on the dry basis.

Formula A:                                                  Parts by wt.
  Copolymer of ethyl acrylate 97% and acrylic acid 3% (45% aqueous latex) _____ 200
  Ammonium chloride in aqueous solution (dry weight) _____ 1
  Melamine-formaldehyde condensate _____ 7
  Clay _____ 100
  Sodium polyacrylate thickener (Acrysol G.S.) __ 2.4

The clay used was substantially free of water solubles and finer than 1.5 microns to the extent of 15% of the total weight.

The ammonium chloride as curing agent was mixed in 10% solution in water into the latex, the clay in the form of the slurry was then admixed and then the thickener.

In a modification of this example, the melamine formaldehyde condensate used was of grade known commercially as "Aerotex M–3."

*Example 2*

The procedure and composition of Example 1 and Formula A were used except that the ammonium chloride there used was replaced by an equal weight of ammonium dihydrogen phosphate.

*Example 3*

The procedure and composition of Example 1 and Formula A are used except that the acrylic acid component of the latex copolymer replaced by an equal weight of methacrylic acid.

*Example 4*

The procedure and composition of Example 1 and Formula A are used except that the ethyl acrylate was replaced by an equal weight of a mixture of 3 parts of ethyl acrylate and 1 part of methacrylate.

*Example 5*

The adhesive of Formula A of Example 1, after admixture of the said melamine-formaldehyde condensate, is applied to foamed polyurethane in the amount of 1.5 ounces dry weight per square yard. The foam is then immediately combined with a piece of rayon jersey, the fabric being brought into contact with the adhesive layer with sufficient pressure to effect good, uniform contact without materially distorting either foam or fabric. The combined sample is then immediately placed in an oven and maintained at 300° F. for 2 minutes, removed and cooled.

The bond obtained is strong enough to cause the foam to tear when delamination is attempted.

A sample of polyurethane foam and rayon jersey adhered according to these instructions was placed in perchlorethylene and kept immersed for 30 minutes. At the end of this time the plied composite was removed and placed in the jaws of a suitable tensile tester (such as a Scott Tester I.P. 4) and the force to produce delamination measured. In all cases this force was in excess of the tensile strength of the foam, causing the foam to break without the occurrence of any appreciable delamination of the sample.

| Cure Time, min. | Temperature, °F. | Tensile Strength,[1] oz./inch |
| --- | --- | --- |
| 2 | 300 | 17 |
| 2½ | 300 | 16 |

[1] At tearing of foam.

Once these properties have been observed various explanations may be advanced to explain them. The satisfactory properties of the adhesive on exposure to a variety of conditions are attributed in part at least to the cross linking caused by reaction involving the hydroxy group of the melamine formaldehyde condensate with the alpha-unsaturated acid moiety (or part) of the copolymer of the acid with the acrylate ester.

In place of the rayon jersey knit as the base material of this example, the following base materials have been used, separately and in turn, in the same manner with the same adhesive and with equal success: wool jersey, cotton broadcloth, nylon taffeta, and orlon jersey.

It will be understood that it is intended to cover all changes and modifications of the examples of the invention herein chosen for the purpose of illustration which do not constitute departures from the spirit and scope of the invention.

I claim:

1. An adhesive composition consisting essentially of an aqueous emulsion of a copolymer of a $C_1$–$C_4$ ester of an acid selected from the group consisting of acrylic and methacrylic acids with 0.5%–5% of its weight of an alpha-unsaturated water soluble acid, an acidic water soluble curing agent in proportion to establish the pH of said emulsion at not above 8 as compounded and not above 7 during the subsequent heating to cure said copolymer, a melamine-formaldehyde condensate reacted with said copolymer, and a stabilizer powder, the stabilizer powder being in the proportion of approximately 20–65 parts by weight for 100 parts of said ester, finely divided, substantially free of water solubles and selected from the group consisting of clay, diatomaceous earth, fuller's earth and cellulose.

2. The composition of claim 1, said alpha-unsaturated acid being selected from the group consisting of acrylic, methacrylic, itaconic, crotonic, mesaconic, citraconic, fumaric and maleic acids and their anhydrides.

3. The adhesive composition of claim 1, said alpha-unsaturated acid being acrylic.

4. The adhesive composition of claim 1, said ester being ethyl acrylate.

5. The adhesive composition of claim 1, said stabilizer powder being water-washed clay of particle sizes within the range 0.4–25 microns.

6. The adhesive composition of claim 1, said curing agent being ammonium chloride.

7. The adhesive composition of claim 1, said curing agent being hydrochloric acid.

8. An adhesive composition consisting essentially of the copolymer of approximately 100 parts dry weight of ethyl acrylate, with about 0.5–5 parts of a water soluble alpha-unsaturated aliphatic acid, a thickener in amount to establish the viscosity of said composition at about 5–30 poises at 20° C., 2–15 parts of a water soluble, hydroxyl-group-retaining melamine-formaldehyde condensate, 20–65 parts of stabilizer powder, and an acidic catalyst for curing of said resin in amount to establish the pH not above 8 for the adhesive composition as compounded and not above 7 during subsequent heating to cure the composition, the whole adhesive composition being dispersed in water in the proportion of 50–200 parts of water for 100 parts of ethyl acrylate and 40–150 parts of additional water for 100 parts of the stabilizer powder.

9. An article of manufacture comprising a foamed sheet of polyurethane plastic, a vapor penetrable backing member, and a dried and cured film of the adhesive of claim 1 adhereing said sheet to the backing member.

References Cited by the Examiner

UNITED STATES PATENTS

| | | | |
|---|---|---|---|
| 2,455,392 | 12/1948 | Balley et al. | 260—29.4 |
| 2,915,486 | 12/1959 | Shelley | 260—29.4 |
| 2,985,611 | 5/1961 | Gaylord | 260—851 |
| 3,070,476 | 12/1962 | Miller. | |
| 3,245,932 | 4/1966 | Glavis et al. | |

MORRIS SUSSMAN, *Primary Examiner.*